United States Patent [19]

Morikawa et al.

[11] Patent Number: 4,957,330
[45] Date of Patent: Sep. 18, 1990

[54] BRAKING DEVICE HAVING AN AUTOMATIC FLUID PRESSURE REGULATING FUNCTION

[75] Inventors: Hirohiko Morikawa, Toyota; Hiroyoshi Kako, Nagoya; Noboru Noguchi; Nobuyasu Nakanishi, both of Toyota, all of Japan

[73] Assignee: Toyota Jidosha Kabushiki Kaisha, Japan

[21] Appl. No.: 307,481

[22] Filed: Feb. 8, 1989

[30] Foreign Application Priority Data

Feb. 27, 1988 [JP] Japan .................................. 63-45423

[51] Int. Cl.$^5$ .............................................. B60T 8/64
[52] U.S. Cl. .................................... 303/115; 303/110; 303/119
[58] Field of Search ...................... 303/9.62, 9.73, 10, 303/110, 113, 114, 115, 116, 117, 119; 188/181 A, 151 A, 349

[56] References Cited

U.S. PATENT DOCUMENTS

| | | | |
|---|---|---|---|
| 3,572,845 | 3/1971 | Johannesen | 303/9.73 |
| 3,752,537 | 8/1973 | Ochiai | 303/115 |
| 3,975,061 | 8/1976 | Kondo et al. | 303/119 |
| 4,179,166 | 12/1979 | Sharp et al. | 303/116 X |
| 4,715,666 | 12/1987 | Farr | 303/117 X |
| 4,822,112 | 4/1989 | Reuter et al. | 188/151 A X |

FOREIGN PATENT DOCUMENTS

| | | | |
|---|---|---|---|
| 2444765 | 4/1976 | Fed. Rep. of Germany | 303/116 |
| 0078858 | 4/1988 | Japan | 303/110 |
| 64-70253 | 3/1989 | Japan. | |
| 0016892 | 6/1981 | PCT Int'l Appl. | 303/9.73 |
| 2187521 | 9/1987 | United Kingdom | 303/113 |

OTHER PUBLICATIONS

Publication No. 0 242 132 of European Patent Application (published on Oct. 21, 1987).

*Primary Examiner*—Duane A. Reger

[57] ABSTRACT

A braking device having a high-pressure hydraulic system including a hydraulic pressure source, a wheel-cylinder hydraulic system including a wheel cylinder for applying brake to a vehicle wheel, a low-pressure hydraulic system including a reservoir, a solenoid-operated directional control valve device for fluid communication of the wheel-cylinder hydraulic system selectively with the high-pressure hydraulic system or the low-pressure hydraulic system, an electric control device connected to the directional control valve device to control the wheel cylinder pressure, and a variable flow restrictor device disposed in the high-pressure hydraulic system or the wheel-cylinder hydraulic system, for decreasing a rate of flow of the fluid through the high-pressure or wheel-cylinder hydraulic system, with an increase in a pressure difference between the high-pressure and wheel-cylinder hydraulic systems, and with an increase in a pressure in the wheel-cylinder hydraulic system. The flow restrictor device may consist of two pilot-operated variable flow restrictor valves which may be disposed in the high-pressure and wheel-cylinder hydraulic systems, respectively, or both disposed in one of these two systems.

16 Claims, 5 Drawing Sheets

FIG.6

BRAKING DEVICE HAVING AN AUTOMATIC FLUID PRESSURE REGULATING FUNCTION

BACKGROUND OF THE INVENTION

1. Field of the Invention

The present invention relates generally to a hydraulically operated braking device for a motor vehicle, and more particularly to such a hydraulic braking device which has a function of automatically regulating the brake fluid pressure in an anti-lock or traction-control manner, or in a manner so as to obtain a desired braking effect.

2. Discussion of the Related Art

In a braking device for an automotive vehicle, the brake fluid pressure or braking pressure is automatically regulated under the control of an electric controller. For example, such an automatic pressure regulating operation is effected during brake application to a wheel in an anti-lock or anti-skid manner so as to avoid an excessive amount or ratio of slip of the wheel, or upon starting or acceleration of the vehicle in a traction-control manner so as to prevent an excessive slip ratio of a drive wheel. The automatic pressure regulation during brake application may also be performed in a manner so as to achieve a desired braking effect exactly corresponding to an operating force or stroke or other parameter indicative of the operating amount or stroke of a brake pedal or other brake operating member, irrespective of a variation in the friction coefficient of a friction member of a brake, a variation in the load of the vehicle, and a variation in the gradient of the road surface on which the vehicle is running.

A braking device having such an automatic pressure regulating function has a high-pressure hydraulic system, a wheel-cylinder hydraulic system, a low-pressure hydraulic system, and a solenoid-operated directional control valve device connected to these hydraulic systems in order to automatically regulate a brake fluid pressure in a wheel cylinder of a brake for a vehicle wheel. The high-pressure hydraulic system includes a hydraulic pressure source such as a master cylinder and a hydraulic pump, and a fluid passage connected to the hydraulic pressure source. The wheel-cylinder hydraulic system includes the wheel cylinder for applying brake to the wheel, and a fluid passage connected to the wheel cylinder. The fluid pressure in the wheel cylinder is controlled directly by the solenoid-operated directional control valve device, or indirectly by the directional control valve device which serves to regulate the pressure of a working fluid of a pressure regulating valve disposed between the wheel cylinder and the directional control valve. The low-pressure hydraulic system usually includes a reservoir for storing under the atmospheric pressure (or a pressure near the atmosphere pressure) the brake fluid, or the working fluid for indirectly regulating the brake fluid pressure, and a fluid passage connected to the reservoir. The solenoid-operated directional control valve device may be a three-position valve which has a pressure-increase position for fluid communication of the wheel-cylinder hydraulic system with the high-pressure hydraulic system, a pressure-decrease position for fluid communication of the wheel-cylinder hydraulic system with the low-pressure hydraulic system, and a pressure-hold position in which the wheel-cylinder hydraulic system is disconnected from both of the high-pressure and low-pressure hydraulic systems. The directional control valve device may be a two-position valve which has the pressure-increase and pressure-decrease positions but does not have a pressure-hold position. Further, the solenoid-operated directional control valve device may be a combination of a plurality of valves, for example, a combination of two solenoid-operated shut-off valves respectively disposed in the high-pressure and low-pressure hydraulic systems, or a combination of a solenoid-operated directional control valve and a solenoid-operated shut-off valve.

In any case, the solenoid-operated directional control valve device is controlled by an electric control device which incorporates a computer. The control device should be adapted to control at least one of an increase rate and decrease rate in the wheel cylinder pressure, so that the wheel cylinder pressure may be optimally regulated. To this end, the solenoid-operated directional control valve device is operated in a duty-cycle control manner wherein the duty cycle of the valve device, e.g., the ratio of the pressure-increase time or pressure-decrease time to the pressure-hold time is properly controlled. Alternatively, a parallel circuit of a fixed flow restrictor and a solenoid operated shut-off valve is provided, so that the rate of flow of the fluid into and from the wheel cylinder is changed in two steps, so that the wheel cylinder pressure may increase and decrease, either slowly or rapidly.

However, such pressure regulating arrangements as described above are not sufficiently satisfactory to accurately and optimally control the wheel cylinder pressure. This is due to the fact that the rate of flow of the fluid through the directional control valve device fluctuates to a considerable extent, with a pressure difference between the upstream and downstream sides of the valve device, upon switching of the valve device to the pressure-increase or pressure-decrease position. In other words, the amount of increase or decrease in the wheel cylinder pressure considerably varies even if the solenoid-operated directional control valve is held in its pressure-increase or pressure-decrease position for a given constant period of time.

In the light of the above, the present applicants developed a braking device as disclosed in Japanese Patent Application No. 62-225860, in which a pilot-operated variable flow restrictor device is provided in one of the high-pressure and wheel-cylinder hydraulic systems. This flow restrictor device is adapted to receive as pilot pressures the pressures in the high-pressure and wheel-cylinder hydraulic systems, so that the rate of fluid flow through the flow restrictor device decreases with a pressure difference between the above two hydraulic systems, in order to adequately regulate the rate of fluid flow from the high-pressure hydraulic system into the wheel cylinder, for controlling the pressure increase in the wheel cylinder.

Figure 7:
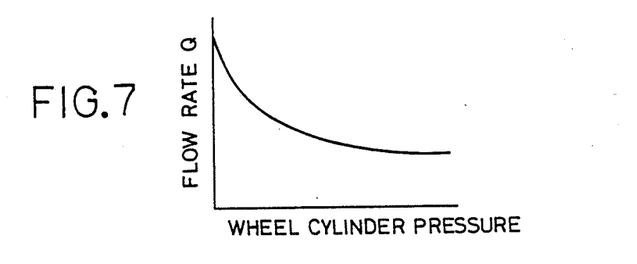
FIG. 7 is a graph illustrating a relationship between the current pressure in a wheel cylinder and the flow rate of the fluid into the wheel cylinder necessary to obtain a given amount of increase in the wheel cylinder pressure.

The applicants recognized a need for improvement of their developed braking device. Described more specifically, the applicants recognized that the amount of pressure increase in the wheel cylinder for a given period of time with the directional control valve placed in its pressure-increase position varies depending not only upon the pressure difference between the high-pressure and wheel-cylinder hydraulic systems, but also upon the pressure in the wheel-cylinder hydraulic system. Thus, the applicants discovered a need of controlling the rate of fluid flow through the flow restrictor valve device, also depending upon the variation in the current pressure in the wheel-cylinder hydraulic system, for accurately regulating the wheel cylinder pressure. This need arises from the fact that the rate of flow of the fluid into the wheel cylinder to obtain a given amount of increase in the wheel cylinder pressure decreases with an increase in the current wheel cylinder pressure, as indicated in the graph of FIG. 7, since the hydraulic circuit through which the fluid is circulated consists of a large number of components, which are made of different materials such as rubber and metals.

SUMMARY OF THE INVENTION

It is therefore an object of the present invention to provide a braking device capable of regulating the wheel cylinder pressure in a more accurate and adequate manner than in the previously developed braking device discussed above.

The above object may be achieved according to the principle of the present invention, which provides a braking system having a function of automatically regulating a pressure of a fluid in a wheel cylinder for applying brake to a wheel of a vehicle, comprising: a high-pressure hydraulic system including a hydraulic pressure source, and a fluid passage connected to the hydraulic pressure source; a wheel-cylinder hydraulic system including the wheel cylinder, and a fluid passage connected to the wheel cylinder; a low-pressure hydraulic system including a reservoir and a fluid passage connected to the reservoir; a solenoid-operated directional control valve device for fluid communication of the wheel-cylinder hydraulic system selectively with the high-pressure hydraulic system or the low-pressure hydraulic system; an electric control device connected to the directional control valve device for controlling the directional control valve device to thereby control the fluid pressure in the wheel cylinder; and a variable flow restrictor device disposed in the fluid passage of the high-pressure hydraulic system or in the fluid passage of the wheel-cylinder hydraulic system, for decreasing a rate of flow of the fluid through the fluid passage of the high-pressure or wheel-cylinder hydraulic system, with an increase in a pressure difference between the high-pressure and wheel-cylinder hydraulic systems, and with an increase in a pressure in the wheel-cylinder hydraulic system.

In the braking device of the present invention constructed as described above, the rate of flow of the fluid through the fluid passage of the high-pressure or wheel-cylinder hydraulic system decreases as the pressure difference between these two hydraulic systems increases, and as the pressure in the wheel-cylinder hydraulic system increases. Described more particularly, in the absence of the flow restrictor device, the rate of fluid flow into the wheel cylinder increases with an increase in a difference by which the pressure in the high-pressure hydraulic system is higher than that in the wheel-cylinder hydraulic system. According to the present invention, the rate of fluid flow into the wheel cylinder is decreased by the flow restrictor device, with the increase in the pressure difference between the two hydraulic systems, in order to obtain a given amount of increase in the wheel cylinder pressure for a given time period. Further, the fluid flow into the wheel cylinder is decreased with the increase in the current pressure in the wheel-cylinder hydraulic system, since the fluid flow rate required to obtain the given amount of increase in the wheel cylinder pressure decreases with the current wheel cylinder pressure, as indicated in FIG. 7.

Accordingly, the variable flow restrictor device, if properly designed, is capable of controlling the rate of flow of the brake fluid from the high-pressure hydraulic system toward the wheel cylinder (or the rate of flow of the working fluid from the high-pressure hydraulic system into a pressure regulating device for indirectly regulating the wheel cylinder pressure), so that the wheel cylinder pressure is raised at a predetermined optimum rate, irrespective of a variation in the pressure difference between the high-pressure and wheel-cylinder hydraulic systems and a variation in the wheel cylinder pressure, when the high-pressure and wheel-cylinder hydraulic systems are brought into communication with each other through the solenoid operated directional control valve device. Namely, the variable flow restrictor device assures a constant amount of increase in the wheel cylinder pressure for a given pressure-increase time of the wheel cylinder, independently of the varying braking condition upon switching of the directional control valve device to its pressure-increase position. Thus, the amount of fluctuation in the pressure-increase amount of the wheel cylinder for the given pressure-increase time may be eliminated, or at least reduced as compared with that in the braking device previously developed by the applicants. Hence, the duty-cycle control of the solenoid-operated directional control valve, or the on-off control of the solenoid-operated shut-off valve combined with a parallel fixed flow restrictor, may be easily performed so as to accurately regulate the amount of increase in the wheel cylinder pressure. In some cases, the duty-cycle control of the solenoid-operated directional control valve may be eliminated, since the amount of increase in the wheel cylinder pressure may be exactly regulated by controlling the time duration for which the directional control valve is held in its pressure-increase position. In this instance, the braking device is simplified and is available at a reduced cost of manufacture.

In one form of the present invention, the variable flow restrictor device comprises a control piston and biasing means. The control piston has a first pressure-receiving surface adapted to receive as a first pilot pressure a pressure in the high-pressure hydraulic system in one of opposite axial directions thereof, and a second pressure-receiving surface adapted to receive as a second pilot pressure the pressure in the wheel-cylinder hydraulic system in the other of the opposite axial directions. The biasing means biases the control piston toward a retracted position thereof in the other axial direction against the first pilot pressure. The first pressure-receiving surface has an area larger than that of the second pressure-receiving surface. In this arrangement, the distance of advancement of the control piston increases with an increase in the difference between the first and second pilot pressures, i.e., with an increase in the difference between the pressures in the high-pressure and wheel-cylinder hydraulic systems, and with an increase in the second pilot pressure, since the area of the first pressure-receiving surface is larger than that of the second pressure-receiving surface. Even when there is no difference between the first and second pilot pressures, the control piston is advanced as the second pilot pressure increases. Therefore, the rate of increase in the wheel cylinder pressure may be held substantially constant, irrespective of the variations in the pressure difference between the first and second pilot pressures and in the pressure in the wheel-cylinder hydraulic system.

In one arrangement of the above form of the invention, the variable flow restrictor device further comprises a housing having a stepped bore having a large-diameter portion and a small-diameter portion, and the control piston comprises a stepped member which has a rear large-diameter portion and a front small-diameter portion. The stepped member is fluid-tightly slidably received in the stepped bore. The control piston and the housing cooperate with each other to define a first pilot chamber behind the large-diameter portion of the control piston, a second pilot chamber in front of the small-diameter portion of the control piston, and an atmospheric pressure chamber in front of a shoulder surface between the large-diameter and small-diameter portions of the control piston. The first and second pilot pressures are applied to the first and second pilot chambers, respectively, while an atmospheric pressure is applied to the atmospheric pressure chamber. In this case, the variable flow restrictor device may further comprise a valve poppet movable with the control piston when the control piston is advanced in the above-indicated one axial direction thereof against the second pilot pressure. The valve poppet includes a conical end portion whose diameter decreases in the above one axial direction. The housing has a valve hole aligned with the conical end portion of the valve poppet. The area of fluid flow through the variable flow restrictor device is defined between the conical portion of the valve poppet and the valve hole, such that fluid flow area decreases as the valve poppet is moved into the valve hole.

Where the variable flow restrictor device comprises a pilot-operated flow restrictor valve as discussed above, the restrictor device may be simplified in construction, with a relatively reduced number of parts, and therefore comparatively economical to manufacture and assemble.

According to another form of the present invention, the variable restrictor device comprises a first pilot-operated variable flow restrictor valve, and a second pilot-operated variable flow restrictor valve connected in series with the first pilot-operated variable flow restrictor valve such that the second pilot-operated variable flow restrictor valve is disposed downwardly of the first pilot-operated variable flow restrictor valve, i.e., between the first variable flow restrictor valve and the solenoid-operated directional control valve. The first pilot-operated variable flow restrictor valve has opposite pressure-receiving surfaces which receive as respective pilot pressures a pressure in the high-pressure hydraulic system and the pressure in the wheel-cylinder hydraulic system, in opposite directions, so that an area of fluid flow through the first pilot-operated variable flow restrictor valve decreases with the increase in the pressure difference between the high-pressure and wheel-cylinder hydraulic systems. The second pilot-operated variable flow restrictor valve is adapted to receive as a pilot pressure the pressure in the wheel-cylinder hydraulic system, so that an area of fluid flow through the second pilot-operated variable flow restrictor valve decreases with the increase in the pressure in the wheel-cylinder hydraulic system. According to the present arrangement wherein the two pilot-operated variable flow restrictor valves are disposed independently of each other, the specifications of flow restrictor members such as control pistons and valve poppets of the two restrictor valves may be determined independently of each other. Therefore, the two restrictor valves may be designed with a high degree of freedom for attaining the desired function.

The second pilot-operated variable flow restrictor valve ma be adapted to comprise: a housing having a stepped bore which includes a central large-diameter portion, and a rear and a front small-diameter portion having a same diameter and located behind and in front of the large-diameter portion; a valve poppet fluid-tightly slidably engaging the front small-diameter portion of the stepped bore; a control piston including a body portion fluid-tightly slidably engaging the central large-diameter portion of the stepped bore, and a counterbalancing portion which has the same diameter as the valve poppet and which extends rearwardly from the body portion so as to fluid-tightly slidably engage the rear small-diameter portion of the stepped bore; and a fluid passage for applying to the counterbalancing portion a pressure which is equal to a pressure which the valve poppet receives, whereby a force which acts on the body portion due to the pressure acting on the valve poppet is counterbalanced by the pressure applied to the counterbalancing portion.

The hydraulic pressure source may comprise a master cylinder which produces a pressure in response to an operation of a brake operating member, and the fluid passage of the high-pressure hydraulic system may consist of a passage connecting the master cylinder to the solenoid-operated directional control valve device. In this case, the braking device may further comprise a by-pass passage connecting the master cylinder and the wheel cylinder while by-passing the variable flow restrictor device, and a solenoid-operated shut-off valve disposed in the by-pass passage. The shut-off valve is normally held open, and being closed when the fluid pressure in the wheel cylinder is controlled by the electric control device.

The electric control device may comprise an anti-lock brake control device which is provided with detector mean for detecting a slip of the wheel upon brake application to the wheel. The anti-lock brake control device is adapted to control the fluid pressure in the wheel cylinder so as to prevent an excessive amount of the slip of the wheel.

According to another aspect of the present invention, there is provided a braking device having a function of automatically regulating a pressure of a fluid in a wheel cylinder for applying brake to a wheel of a vehicle, comprising: a high-pressure hydraulic system including a hydraulic pressure source, and a fluid passage connected to the hydraulic pressure source; a wheel-cylinder hydraulic system including the wheel cylinder, and a fluid passage connected to the wheel cylinder; a low-pressure hydraulic system including a reservoir and a fluid passage connected to the reservoir; a solenoid-operated directional control valve device for fluid communication of the wheel-cylinder hydraulic system selectively with the high-pressure hydraulic system or the low-pressure hydraulic system; an electric control device connected to the directional control valve device for controlling the directional control valve device to thereby control the fluid pressure in the wheel cylinder; a first pilot-operated variable flow restrictor valve disposed in the fluid passage of the high-pressure hydraulic system and having opposite pressure-receiving surfaces which receive as respective pilot pressures a pressure in the high-pressure hydraulic system and the pressure in the wheel-cylinder hydraulic system, in opposite directions, so that an area of fluid flow through the first pilot-operated variable flow restrictor valve decreases with the increase in the pressure difference between the high-pressure and wheel-cylinder hydraulic systems; and a second pilot-operated variable flow restrictor valve disposed in the fluid passage of the wheel-cylinder hydraulic system, and receiving as a pilot pressure the pressure in the wheel-cylinder hydraulic system, so that an area of fluid flow through the second pilot-operated variable flow restrictor valve decreases with the increase in the pressure in the wheel-cylinder hydraulic system.

In the above aspect of the invention wherein the first and second pilot-operated variable flow restrictor valves are provided in the fluid passages of the high-pressure and wheel-cylinder hydraulic systems, respectively, the second pilot-operated variable flow restrictor valve may also function to adequately control the rate of flow of the brake fluid from the wheel-cylinder hydraulic system into the low-pressure hydraulic system, when the wheel-cylinder hydraulic system is brought into communication with the low-pressure hydraulic system by the solenoid-operated directional control valve device, to lower the wheel cylinder pressure. In this case, at least one of the fluid passages of the high-pressure and low-pressure hydraulic systems may be provided with fixed flow restrictor means different from the first and second pilot-operated variable flow restrictor valves. The fixed flow restrictor means functions to compensate for inconsistency in the operating characteristics of the second pilot-operated variable flow restrictor valve, between the pressure-increase and pressure-decrease operations of the directional control valve device.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
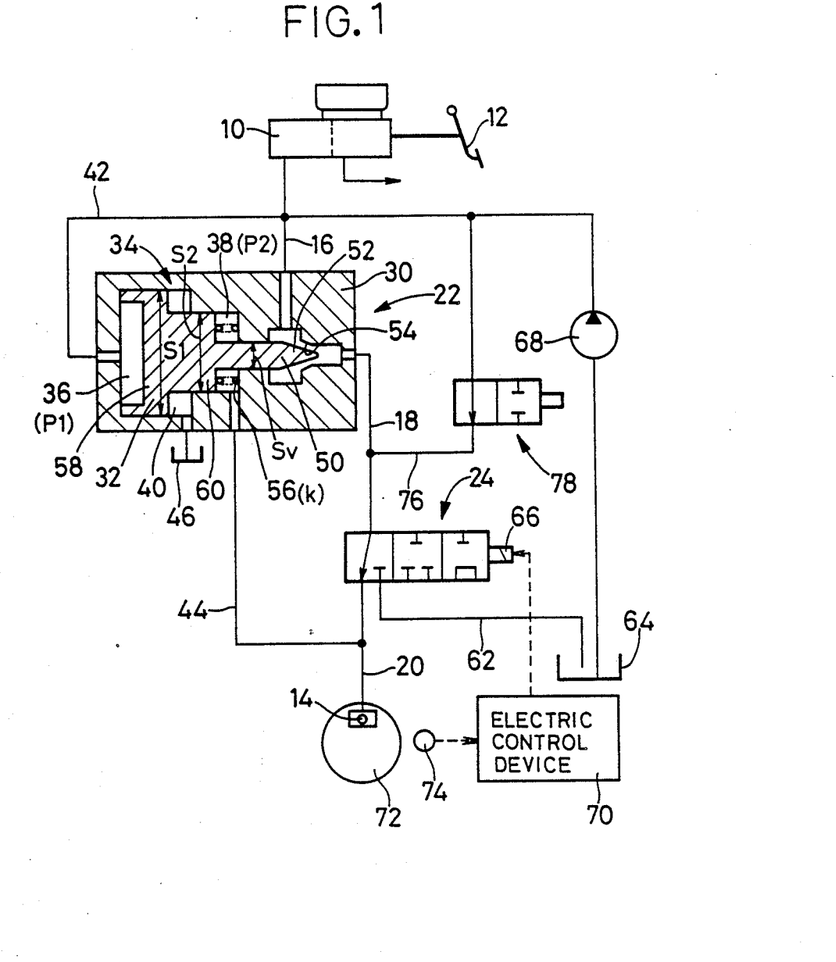
FIG. 1 is a schematic view of one embodiment of a hydraulic braking device of the present invention, including a front elevational view in cross section of a pilot-operated variable flow restrictor valve.

Referring first to FIG. 1, reference numeral 10 designates a hydraulic pressure source in the form of a master cylinder having two mutually independent pressure chambers. Upon operation of a brake operating member in the form of a brake pedal 12, a same pressure of a working fluid is developed in each of the two pressure chambers of the master cylinder 10. The pressure developed in one of the two pressure chambers is transmitted to wheel cylinders of two brakes for a left-front and a right-front wheel of a motor vehicle, and the pressure developed in the other pressure chamber is transmitted to wheel cylinders of two brakes for a left-rear and a right-rear wheel of the vehicle. Reference numeral 14 in FIG. 1 denotes the wheel cylinder for the left-front wheel. This wheel cylinder 14 is connected to the master cylinder 10 through fluid passages 16, 18 and 20. A pilot-operated variable flow restrictor valve (hereinafter simply called "flow restrictor valve") 22 is connected between the fluid passages 16 and 18, while a solenoid-operated three-position directional control valve (hereinafter simply called "directional control valve") 24 is connected between the fluid passages 18 and 20.

The flow restrictor valve 22 has a housing 30 and a stepped control piston 32. The control piston 32 is fluid-tightly axially slidably received in a stepped cylinder bore 34 formed in the housing 30. The stepped cylinder bore 34 has a large-diameter portion and a small-diameter portion. The control piston 32 has a rear large-diameter portion 58 (left portion as viewed in FIG. 1) received in the large-diameter portion of the bore 34, and a front small-diameter portion 60 (right portion as viewed in FIG. 1) received in the small-diameter portion of the bore 34. The control piston 32 and the housing 30 cooperate with each other to define a first pilot chamber 36 behind the rear large-diameter portion 58 of the control piston 32, a second pilot chamber 38 in front of the front small-diameter portion 60 of the control piston 32, and an atmospheric pressure chamber 40 in front of a shoulder surface between the large-diameter and small-diameter portions 58, 60 of the control piston 32. The first pilot chamber 36 is connected by a pilot passage 42 to the fluid passage 16, and the second pilot chamber 38 is connected by a pilot passage 44 to the fluid passage 20. The atmospheric pressure chamber 40 is connected to a reservoir 46.

The control piston 32 is provided with a valve poppet 50 fixed thereto. The valve poppet 50 is formed with a conical end portion 52 whose diameter decreases in one of opposite axial directions of the control piston 32, i.e., in the forward axial direction from the rear large-diameter portion 58 toward the front small-diameter portion 60. The housing 30 has a tapered valve hole 54 aligned with the valve poppet 50, so that the valve poppet 50 is movable into the valve hole 54. The control piston 32 is biased by a spring 56 toward its retracted position. When the control piston 32 is advanced from the retracted position (position of FIG. 1) with the pressure in the master cylinder 10 being applied to the first pilot chamber 36 through the fluid passage 16 and pilot passage 42, the following equation (1) of equilibrium of forces is established with respect to the control pistion 32:

$$P1S1 = P2(S2-Sv) + P1Sv + kx \qquad (1)$$

where,
- P1: First pilot pressure in the first pilot chamber 36
- P2: Second pilot pressure in the second pilot chamber 38
- S1: Transverse cross sectional area of the large-diameter portion 58 of the control piston 32
- S2: Transverse cross sectional area of the small-diameter portion 60 of the control piston 32
- Sv: Transverse cross sectional area of a constant-diameter portion of the valve poppet 50
- k: Constant of the spring 56
- x: Amount of contraction of the spring 56, that is, distance of movement of the control piston 32 from the retracted position (the set load of the spring 56 is set to be negligibly small)

Since the fluid pressure acting on the valve poppet 50 is almost equal to the first pilot pressure P1, the pressure on the poppet 50 is also expressed as P1. Therefore, the movement distance x of the control piston 32 may be expressed by the following equation (2) which is obtained from the above equation (1):

$$x = \frac{P1(S1-Sv) - P2(S2-Sv)}{k} \qquad (2)$$

If ΔP represents a difference (P1−P2) obtained by subtracting the second pilot pressure P2 from the first pilot pressure P1, the above equation (2) is converted into the following equation (3):

$$x = \frac{\Delta P(S1-Sv)}{k} + \frac{P2(S1-S2)}{k} \qquad (3)$$

Figure 2:
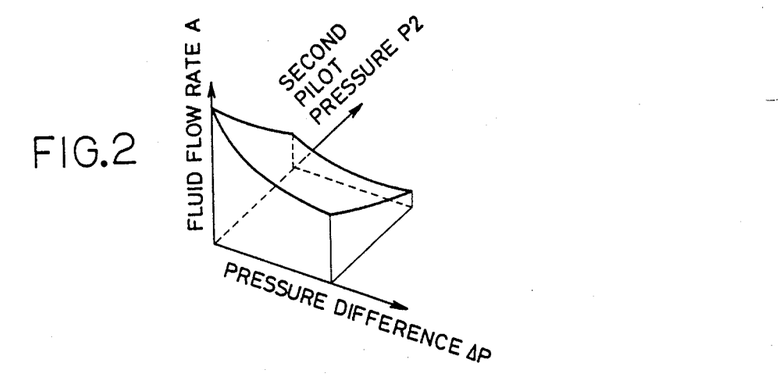
FIG. 2 is a graph indicating a relationship among a variable fluid flow rate or fluid communication cross sectional area A, a fluid pressure difference between a first and a second pilot pressure, and the second pilot pressure, of the flow restrictor valve in the braking device of FIG. 1.

It will be understood from the above equation (3) that the distance x of advancement of the control piston 32, i.e., the distance of movement of the valve poppet 50 into the valve hole 54 increases with an increase in the fluid pressure difference ΔP and with an increase in the second pilot pressure P2. Consequently, the cross sectional area A between the inner surface of the valve hole 54 and the outer surface of the conical end portion 52, i.e., the cross sectional area A for fluid communication between the fluid passages 16, 18 decreases with the increases in the pressure difference ΔP and in the second pilot pressure P2, as indicated in the graph of FIG. 2.

It follows from the foregoing description that the flow restrictor valve 22, pilot passages 42, 44 and reservoir 46 constitute a variable flow restrictor device disposed in the fluid passage 16, 18 between the master cylinder 10 and the directional control valve 24. The control piston 32 has a first pressure-receiving surface whose area Sa is a difference (S1−Sv) between the cross sectional area S1 of the large-diameter portion 58 and the cross sectional area Sv of the constant-diameter portion of the valve poppet 50. The control piston 32 further has a second pressure-receiving surface whose area Sb is a difference (S2−Sv) between the cross sectional area S2 of the small-diameter portion 60 and the cross sectional area Sv of the poppet 50. According to these definitions of Sa, Sb of the cross sectional areas of the first and second pressure-receiving surfaces of the control piston 32, the above equation (3) is converted into the following equation (4):

$$x = \frac{\Delta P Sa}{k} + \frac{P2(Sa-Sb)}{k} \qquad (4)$$

The three-position directional control valve 24 is connected to a reservoir 64 through a reservoir passage 62. The directional control valve 24 has a pressure-increase position in which the fluid passage 20 is disconnected from the reservoir passage 62 and is connected to the fluid passage 18 for fluid communication of the wheel cylinder 14 with the master cylinder 10. Normally, the directional control valve 24 is placed in this pressure-increase position which permits the pressure of the master cylinder 10 to be applied to the wheel cylinder 14, to increase the pressure in the wheel cylinder 14. The valve 24 further has a pressure-hold position in which the fluid passage 20 is disconnected from both of the fluid passage 18 and the reservoir passage 62, and a pressure-decrease position in which the fluid passage 20 is disconnected from the fluid passage 18 and is connected to the reservoir passage 64 for fluid communication of the wheel cylinder 14 with the reservoir 64 so as to decrease the pressure in the wheel cylinder 14. The directional control valve 24 is placed in its pressure-hold position when a relatively small amount of electric current is applied to a solenoid coil 66 of the valve 24, and is placed in its pressure-decrease position when the solenoid coil 66 is energized with a relatively large amount of electric current. The fluid discharged from the wheel cylinder 14 into the reservoir 64 is pumped by a pump 68 and returned into the fluid passage 16.

The solenoid coil 66 is controlled by an electric control device 70 whose major portion is constituted by a computer. The electric control device 70 is adapted to receive a signal from a speed sensor 74 which detects the rotating speed of a disc rotor 72 which rotates with the left-front wheel and which is provided with the wheel cylinder 14. The control device 70 also receives signals from other speed sensors, which are indicative of the rotating speeds of the other wheels of the vehicle. Based on the signals from these speed sensors including the sensor 74, the control device 70 presumes or estimates the slip ratio of the left-front wheel, and controls the directional control valve 24 so that the slip ratio of the left-front wheel is maintained within an optimum range. In this embodiment, the three-position directional control valve 24 constitutes a solenoid-operated directional control valve device for selective fluid communication of the wheel cylinder 14 with the master cylinder 10 or reservoir 64, or for disconnection of the wheel cylinder 14 from both of the master cylinder and reservoir 10, 64.

While the brake pedal 12 is in a non-operated position, the directional control valve 24 is in the pressure-increase position (position of FIG. 1), and no pressure is developed in the master cylinder 10, fluid passages 16, 18, 20 and wheel cylinder 14. Further, the control piston 32 of the flow restrictor valve 22 is held in its fully retracted position, in which the cross sectional area A for fluid flow through the valve 22 is maximum.

When the brake pedal 12 is depressed, the pressures in the master cylinder 10, fluid passages 16, 18, 20 and wheel cylinder 14 are raised. If the pressure in the wheel cylinder 14 becomes excessively high in relation to the friction coefficient between the left-front wheel and the road surface, with a result of the slip ratio of the left-front wheel exceeding the permissible upper limit, the control device 70 initiates an anti-skid or anti-lock pressure control of the directional control valve 24, based on the output signal of the speed sensor 74. Namely, the control device 70 initially switches the directional control valve 24 to its pressure-decrease position (right position in FIG. 1). Consequently, the brake fluid is discharged from the wheel cylinder 14 toward the reservoir 64, whereby the pressure in the wheel cylinder 14 is lowered. After the directional control valve 24 is held in its pressure-decrease position for a given period of time, the valve 24 is switched to its pressure-hold position. After the slip ratio of the left-front wheel is reduced to fall within the optimum range, the valve 24 is switched to its pressure-increase position. As a result, the pressure in the master cylinder 10 is again applied to the wheel cylinder 14 via the flow restrictor valve 22. At this time, the rate of flow of the fluid from the master cylinder 10 to the wheel cylinder 14 is suitably restricted or controlled, such that the rate of fluid flow through the restrictor valve 22 decreases with an increase in the pressure difference between the fluid passages 16 and 20, and with an increase in the pressure in the fluid passage 20. In other words, the fluid flows from the fluid passage 16 into the fluid passage 18 (into the directional control valve 24) at an optimum rate, irrespective of a variation in the pressure difference between the passages 16, 20 and a variation in the pressure in the passage 20. Thus, the pressure in the wheel cylinder 14 is increased at a substantially constant rate as the fluid flows through the flow restrictor valve 22.

During the anti-lock pressure control operation of the wheel cylinder 14, the control device 70 controls the directional control valve 24 such that the pressure-increase and the pressure-hold positions are alternately established, with a controlled time ratio of these two positions, so that the pressure in the wheel cylinder 14 is increased slowly or at a relatively low rate. After the slip ratio of the left-front wheel is reduced to within the predetermined optimum range, the directional control valve is maintained in its pressure-hold position.

With the above operations repeatedly performed under the control of the control device 70, the pressure in the wheel cylinder 14 is regulated so as to maintain the slip ratio of the left-front wheel in the optimum range. Since the control piston 32 of the flow restrictor valve 22 is advanced as the pressure difference between the fluid passages 16 and 20 increases and as the pressure in the fluid passage 20 increases, the cross sectional fluid flow area A defined by the conical end portion 52 of the valve poppet 50 and the valve hole 54 is adequately controlled according to the distance of advancement of the control piston 32, so that the pressure in the wheel cylinder 14 increases at a substantially constant rate, without being influenced by the variations in the pressure difference between the fluid passages 16, 20 and in the pressure in the fluid passage 20. Therefore, the pressure in the wheel cylinder 14 can be easily regulated by the switching operation of the directional control valve 24, with improved accuracy based on the estimated slip ratio of the left-front wheel.

In the present specific embodiment, the rate of fluid flow from the master cylinder 10 to the wheel cylinder 14 is regulated by the flow restrictor valve 22 also during a normal braking operation which does not involve an anti-lock pressure control. However, this flow restricting action of the flow restrictor valve 22 does not adversely influence the normal braking operation. If it is desired to inhibit the operation of the flow restrictor valve 22 during the normal braking operation, suitable by-passing means may be provided. For example, a by-pass passage 76 is provided so as to connect the fluid passage 16 and the fluid passage 18 while by-passing the flow restrictor valve 22, and a solenoid-operated shut-off valve 78 is disposed in the b-pass passage 76, as shown in FIG. 1. In this case, the control device 70 is adapted to normally hold the shut-off valve 78 in its open position, and close the shut-off valve 78 when the control device 70 controls the directional control valve 24 in an anti-lock pressure control manner so as to avoid an excessive slip ratio of the left-front wheel. Obviously, by-pass passage 76 and shut-off valve 78 may be omitted if inhibition of the flow restrictor valve is not desired.

It will be understood from the above description that the master cylinder 10 and the fluid passages 16, 18 constitute a high-pressure hydraulic system, and the wheel cylinder 14 and the fluid passage 20 constitute a low-pressure hydraulic system, and that the reservoir passage 62 and the reservoir 64 constitute a low-pressure hydraulic system.

Figure 3:
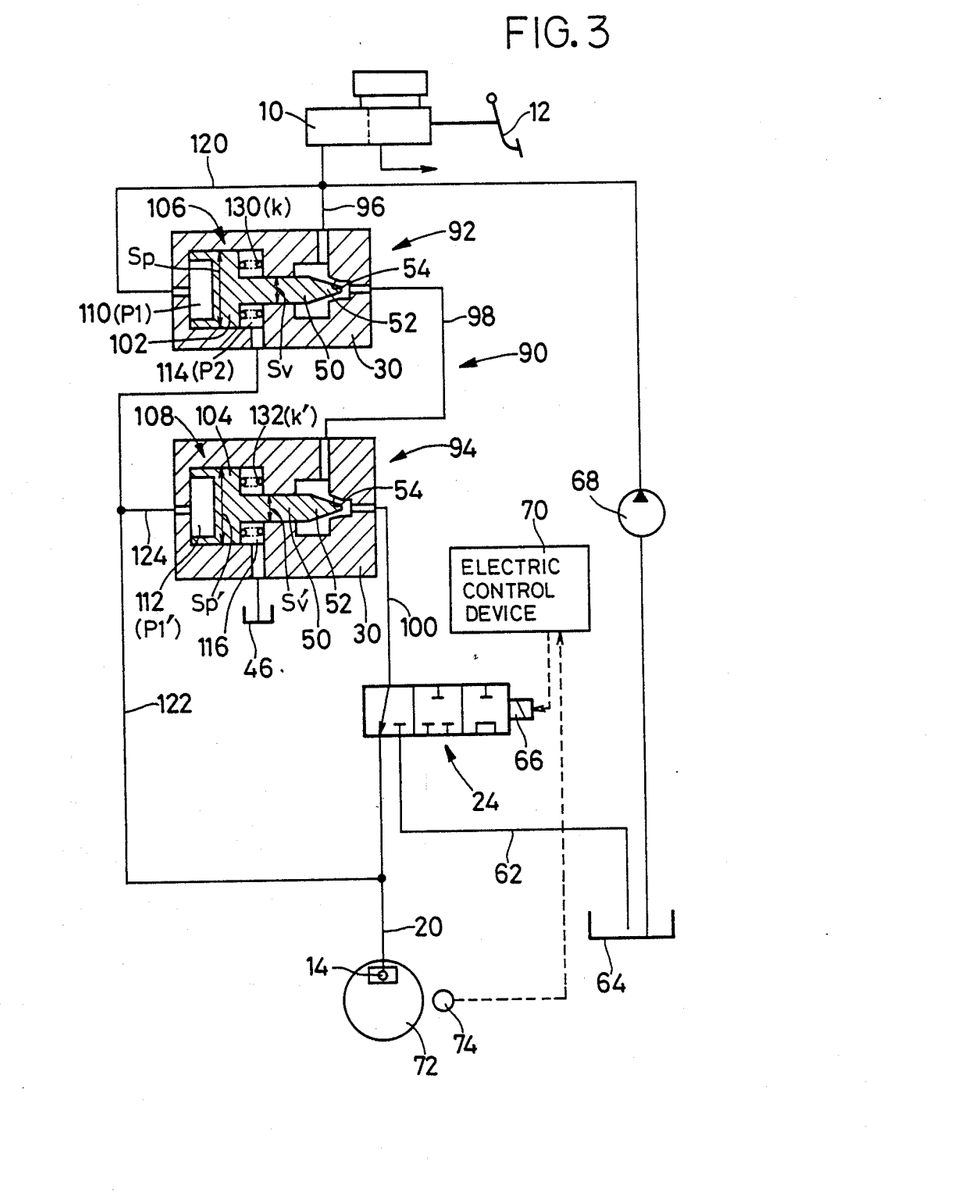
FIG. 3 is a schematic view of another embodiment of the invention, including front elevational views in cross section of a first and a second pilot-operated flow restrictor valve.

Referring next to FIG. 3, a second embodiment of the present invention will be described. The second embodiment is different from the first embodiment, only in the construction of the variable flow restrictor valve device. In the interest of brevity and simplification, the same reference numerals as used in FIG. 1 will be used in FIG. 3 to identify the other parts of the braking system of the second embodiment which are identical with the corresponding parts of FIG. 1, and no redundant description of these parts will be provided.

The second embodiment uses a first pilot-operated variable flow restrictor valve 92 and a second pilot-operated variable flow restrictor valve 94, which are connected in series with each other. These two restrictor valves 92, 94 are both disposed in a fluid passage 90 connecting the master cylinder 10 and the three-position directional control valve 24, such that the first restrictor valve 92 is provided between the master cylinder 10 and the second restrictor valve 94, while the second restrictor valve 94 is provided between the first restrictor valve 92 and the directional control valve 24. In this arrangement, the fluid passage 90 is divided by the two restrictor valves 92, 94 into a fluid passage 96, a fluid passage 98, and a fluid passage 100, as indicated in FIG. 3.

Unlike the control piston 32 of the flow restrictor valve 22 of the preceding embodiment, control pistons 102, 104 of the restrictor valves 92, 94 are not stepped, and are fluid-tightly slidably received in respective non-stepped cylinder bores 106, 108 formed in respective housings 30. Each control piston 102, 104 cooperates with the corresponding housing 30 to define a first pilot chamber 110, 112 behind (to the left of) the control piston 102, 104, and a second pilot chamber 114, 116 in front (to the right) of the control piston. The first pilot chamber 110 of the first restrictor valve 92 is connected by a pilot passage 120 to the fluid passage 96, while the second pilot chamber 114 is connected by a pilot passage 122 to the fluid passage 20 indicated above. The first pilot chamber 112 of the second restrictor valve 94 is connected by a pilot passage 124 to the pilot passage 122, while the second pilot chamber 116 is connected to the reservoir 46 indicated above. Namely, the second pilot chamber 116 serves as an atmospheric pressure chamber. The control pistons 102, 104 are both biased toward their fully retracted positions by respective springs 130, 132.

In the first pilot-operated flow restrictor valve 92, the pressure in the master cylinder 10 is applied to the first pilot chamber 110 through the fluid passage 96 and pilot passage 120. When the control piston 102 is advanced from the retracted position (position of FIG. 3), the following equation (5) of equlibrium of forces is established with respect to the control piston 102:

$$P1Sp = P2(Sp - Sv) + P1Sv + kx \quad (5)$$

where,
P1: First pilot pressure in the first pilot chamber 110
P2: Second pilot pressure in the second pilot chamber 114
Sp: Transverse cross sectional area of the control piston 102
Sv: Transverse cross sectional area of a constant-diameter portion of the valve poppet 50
k: Constant of the spring 130
x: Amount of contraction of the spring 130, that is, distance of movement of the control piston 102 from the retracted position Accordingly, the movement distance x of the control piston 102 may be expressed by the following equation (6) which is obtained from the above equation (5):

$$x = \frac{(P1 - P2) \cdot (Sp - Sv)}{k} \quad (6)$$

If ΔP represents a difference (P1−P2) between the first and second pilot pressures P1 and P2, the above equation (6) is converted into the following equation (7):

$$x = \frac{\Delta P(Sp - Sv)}{k} \quad (7)$$

It follows from the above equation (7) that the movement distance x of the control piston 102 is controlled in proportion to the pressure difference ΔP, so that the rate of flow of the brake fluid from the first restrictor valve 92 is suitably controlled according to the pressure difference ΔP between the fluid passages 96 and 20.

In the second pilot-operated flow restrictor valve 94, the pressure in the wheel cylinder 14 is applied to the first pilot chamber 112 through the pilot passages 122 and 124. When the control piston 104 is advanced from the retracted position (position of FIG. 3), the following equation (8) of equlibrium of forces is established with respect to the control piston 104:

$$P1'Sp' = P1Sv' + k'x' \quad (8)$$

were,
P1': First pilot pressure in the first pilot chamber 112
Sp': Transverse cross sectional area of the control piston 104
Sv': Transverse cross sectional area of a constant-diameter portion of the valve poppet 50
k': Constant of the spring 132
x': Amount of contraction of the spring 132, that is, distance of movement of the control piston 104 from the retracted position Accordingly, the movement distance x' of the control piston 104 may be expressed by the following equation (9) which is obtained from the above equation (8):

$$x' = \frac{P1'Sp' - P1Sv'}{k'} \quad (9)$$

The pressure P1' in the first pilot chamber 112 is almost equal to the pressure P2 in the second pilot chamber 114. If the pressure P1' is represented by P2 and the difference (P1−P2) is represented by ΔP, the above equation (9) is converted into the following equation (10):

$$x' = \frac{P2(Sp' - Sv')}{k'} + \frac{\Delta P Sv'}{k'} \quad (10)$$

It follows from the above equation (10) that the movement distance x' of the control piston 104 increases with an increase in the second pilot pressure P2, i.e., with an increase in the pressure in the fluid passage 20. Although the movement distance x' increases with an increase in the pressure difference ΔP, the influence of the pressure difference ΔP on the movement distance x' is considerably smaller than that of the second pilot pressure P2, since the cross sectional area Sv' is considerably smaller than the cross sectional area (Sp'−Sv'). Namely, the movement distance x' is determined primarily by the level of the pressure in the fluid passage 20.

Accordingly, the rate of flow of the fluid from the first restrictor valve 92 toward the directional control valve 24 is further restricted by the second restrictor valve 94, depending upon the pressure in the fluid passage 20. As a result, the rate of flow of the fluid from the fluid passage 98 into the fluid passage 100 through the second restrictor valve 94 is suitably controlled according to the pressure difference between the fluid passages 96, 20 and the pressure in the fluid passage 20.

It will be understood from the above description that the present embodiment includes a high-pressure hydraulic system consisting of the master cylinder 10 and the fluid passage 90 (fluid passages 96, 98, 100), a wheel-cylinder hydraulic system consisting of the wheel cylinder 14 and the fluid passage 20, and a low-pressure hydraulic system consisting of the reservoir 64 and the reservoir passage 62. It will also be understood that the first and second restrictor valves 92, 94, pilot passages 120, 122, 124 and reservoir 46 constitute a variable flow restrictor device disposed in the fluid passage 90 of the high-pressure hydraulic system, while the three-position directional control valve 24 constitutes a solenoid-operated directional control valve for selective communication of the wheel-cylinder hydraulic system with the high-pressure hydraulic system or the low-pressure hydraulic system.

Figure 4:
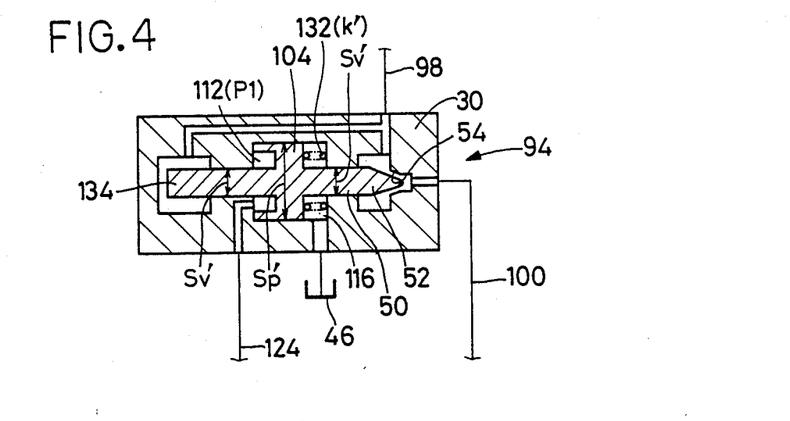
FIG. 4 is a front elevational view in cross section of a modified form of the second pilot-operated flow restrictor valve.

Referring to FIG. 4, there is illustrated a modified form of the second restrictor valve 94. In this embodiment of the invention, the movement distance x' of the control piston 104 is determined solely by the pressure in the wheel cylinder 14. Described more specifically, the the control piston 104 of the second restrictor valve 94 of FIG. 4 is formed with a counterbalancing portion 134 which concentrically extends rearwardly from the rear end of the central body portion fluid-tightly slidably received in a large-diameter portion of the stepped bore formed in the housing 30. This counterbalancing portion 134 is fluid-tightly slidably received in a small-diameter portion of the stepped bore, and has the same diameter as the valve poppet 50, i.e., has a transverse cross sectional area equal to the cross sectional area Sv' of the valve poppet 50. In the instant modified second restrictor valve 94, the pressure in the fluid passage 98 is also applied to the counterbalancing portion 134 such that the pressure acts on the portion 134 in the forward direction and thereby counterbalances the pressure which acts on the valve poppet 50 in the rearward direction. In this case, the movement distance $x'$ of the control piston 104 is expressed by the following equation (11):

$$x' = \frac{P2(Sp' - Sv')}{k'} \tag{11}$$

Figure 5:
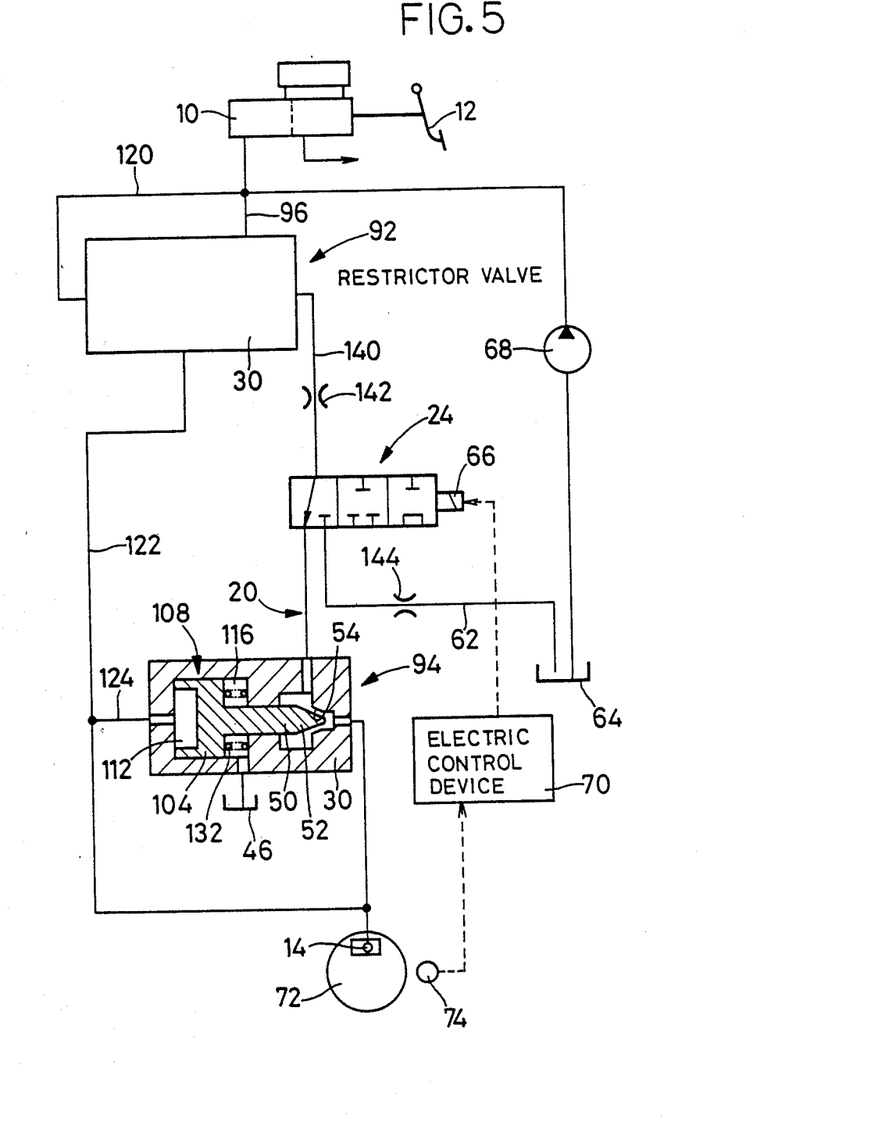
FIG. 5 is a schematic view of a further embodiment of the invention wherein the second pilot-operated flow restrictor valve is disposed at a position different from that of FIG. 3, including a front elevational view in cross section of the second pilot-operated flow restrictor valve.

Another embodiment of the braking device of the present invention will be described referring to FIG. 5, which is different from the embodiment of FIG. 3, in the location of the second restrictor valve 94. The other parts of the instant modified embodiment of FIG. 5 are identical with those of the embodiment of FIG. 3 and will not be described, with the same reference numerals being accorded to these parts.

The second restrictor valve 94 is disposed in the fluid passage 20 connecting the three-position directional control valve 24 and the wheel cylinder 14. The rate of flow of the fluid from the master cylinder 10 toward the wheel cylinder 14 through the directional control valve 24 is controlled by the restrictor valve 94, in the same manner as in the embodiment of FIG. 3.

In the instant embodiment, however, the second restrictor valve 94 also functions to suitably control the rate of flow of the fluid from the wheel cylinder 14 toward the reservoir 64, when the directional control valve 24 is placed in its pressure-decrease position. When the pressure in the wheel cylinder 14 is applied to the first pilot chamber 112 of the second restrictor valve 94, the control piston 104 is advanced from its fully retracted position of FIG. 5, by the thus elevated pressure in the first pilot chamber 112. Accordingly, when the wheel cylinder 14 is brought into communication with the reservoir 64 through the fluid passage 20, second restrictor valve 94, directional control valve 24 and reservoir passage 62, the rate of flow of the fluid from the restrictor valve 94 toward the directional control valve 24 is controlled by the restrictor valve 94 such that the flow rate decreases with an increase in the pressure in the wheel cylinder 14. Thus, the amount of decrease in the pressure in the wheel cylinder 14 for a given time period may be kept constant, irrespective of the pressure in the wheel cylinder 14.

In the present embodiment, a fixed flow restrictor 142 is disposed in a fluid passage 140 connecting the first restrictor valve 92 and the directional control valve 24, while another fixed flow restrictor 144 is disposed in the reservoir passage 62. These fixed flow restrictors 142, 144 are provided to compensate for inconsistency in the operating characteristics of the second restrictor valve 94, between the pressure-increase operation and the pressure-decrease operation of the directional control valve 24.

It will be understood from the above description that the present embodiment has a high-pressure hydraulic system consisting of the master cylinder 10 and the fluid passages 96, 140, a wheel-cylinder hydraulic system consisting of the wheel cylinder 14 and the fluid passage 20, and a low-pressure hydraulic system consisting of the reservoir 64 and the reservoir passage 62, and that the three-position directional control valve constitutes a solenoid-operated directional control valve device, while the first and second pilot-operated variable flow restrictor valves 92, 94, pilot passages 120, 122, 124 and reservoir 46 constitute a variable flow restrictor device.

Figure 6:
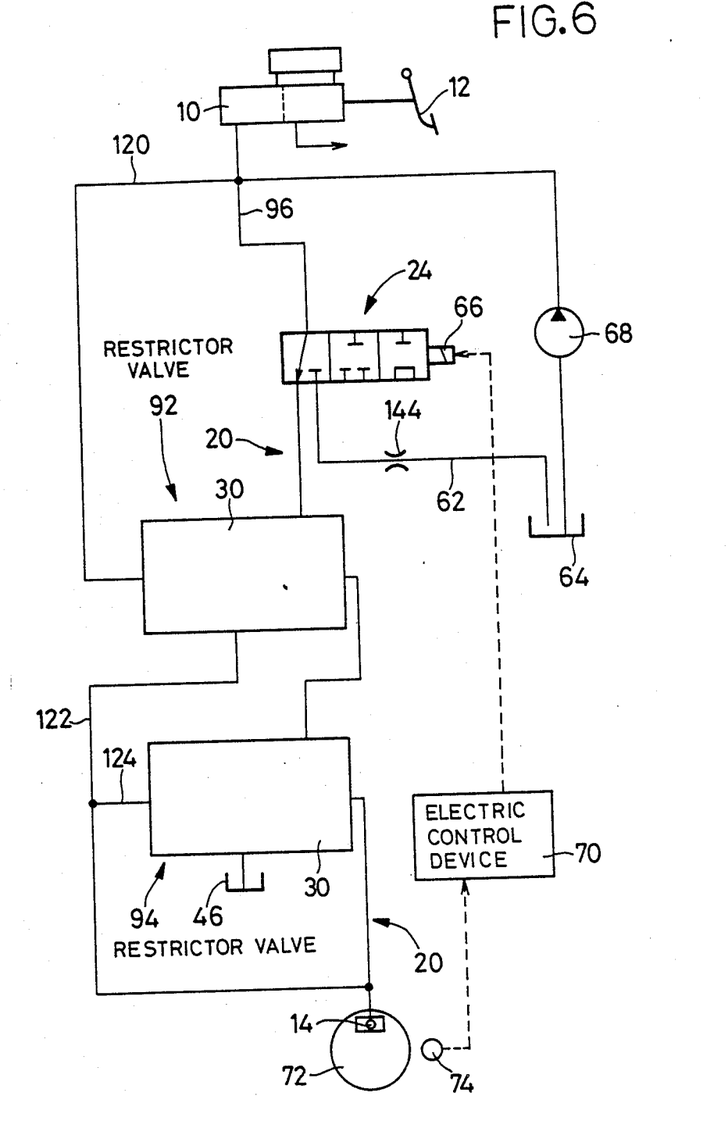
FIG. 6 is a schematic view showing a still further embodiment of the invention.

Referring further to FIG. 6, there will be described a further modified embodiment of the invention, wherein the first and second variable flow restrictor valves 92, 94 are both disposed in the fluid passage 20 connecting the directional control valve 24 and the wheel cylinder 14. In this case, both of the two restrictor valves 92, 94 also function to control the rate of fluid flow from the wheel cylinder 14 toward the reservoir 64 upon switching of the directional control valve 24 to its pressure-decrease position.

The above-described several different preferred embodiments of the braking device of the present invention all take the form of an anti-skid or anti-lock braking device of a recirculating type wherein the pressure in the wheel cylinder 14 is regulated directly by the three-position directional control valve 24. However, the principle of the present invention is equally applicable to a braking device of a variable-volume type wherein the directional control valve 24 is connected to the wheel cylinder 14 via a pressure regulating valve, and the pressure in the wheel cylinder 14 is regulated indirectly by the directional control valve 24 such that the pressure of the working fluid of the pressure regulating valve is controlled by the directional control valve 24.

While the present invention has been described in its presently preferred embodiments, for illustrative purpose only, it is to be understood that the invention is not limited to the details of the illustrated embodiments, but may be embodied with various changes, modifications and improvements, which may occur to those skilled in the art, without departing from the spirit and scope of the invention defined in the following claims.

What is claimed is:

1. A braking device having a function of automatically regulating a pressure of a fluid in a wheel cylinder for applying brake to a wheel of a vehicle, comprising:
   a high-pressure hydraulic system including a hydraulic pressure source, and a fluid passage connected to said hydraulic pressure source;
   a wheel-cylinder hydraulic system including said wheel cylinder, and a fluid passage connected to said wheel cylinder;
   a low-pressure hydraulic system including a reservoir and a fluid passage connected to said reservoir;
   a solenoid-operated directional control valve device for fluid communication of said wheel-cylinder hydraulic system selectively with said high-pressure hydraulic system or said low-pressure hydraulic system;
   an electric control device connected to said directional control valve device for controlling the directional control valve device to thereby control the fluid pressure in said wheel cylinder; and
   a variable flow restrictor device disposed in said fluid passage of said high-pressure hydraulic system, for decreasing a rate of flow of the fluid through said fluid passage of the high-pressure hydraulic system, with an increase in a pressure difference between said high-pressure and wheel-cylinder hydraulic systems, and with an increase in a pressure in said wheel-cylinder hydraulic system.

2. A braking device according to claim 1, wherein said variable flow restrictor device comprises a control piston and biasing means, said control piston having a first pressure-receiving surface receiving as a first pilot pressure a pressure in said high-pressure hydraulic system in one of opposite axial directions thereof, and a second pressure-receiving surface receiving as a second pilot pressure the pressure in said wheel-cylinder hydraulic system in the other of said opposite axial directions, said biasing means biasing said control piston toward a retracted position thereof in said other axial direction against said first pilot pressure, said first pressure-receiving surface having an area larger than that of said second pressure-receiving surface.

3. A braking device according to claim 2, wherein said variable flow restrictor device further comprises a housing having a stepped bore having a large-diameter portion and a small-diameter portion, and said control piston comprises a stepped member which has a rear large-diameter portion and a front small-diameter portion, and which is fluid-tightly slidably received in said stepped bore, said control piston and said housing cooperating with each other to define a first pilot chamber behind said large-diamter portion of said control piston, a second pilot chamber in front of said small-diameter portion of said control piston, and an atmospheric pressure chamber in front of a shoulder surface between said large-diameter and small-diameter portions of said control piston, said first and second pilot pressures being applied to said first and second pilot chambers, respectively, while an atmospheric pressure being applied to said atmospheric pressure chamber.

4. A braking device according to claim 3, wherein said variable flow restrictor device further comprises a valve poppet movable with said control piston when the control piston is advanced in said one axial direction thereof against said second pilot pressure, said valve poppet including a conical end portion whose diameter decreases in said one axial direction, said housing having a valve hole aligned with said conical end portion of said valve poppet, said area of fluid flow through said variable flow restrictor device being defined between said conical portion of said valve poppet and said valve hole and decreasing as said valve poppet is moved into said valve hole.

5. A braking device according to claim 1, wherein said variable restrictor device comprises:
  a first pilot-operated variable flow restrictor valve having opposite pressure-receiving surfaces which receive as respective pilot pressures a pressure in said high-pressure hydraulic system and the pressure in said wheel-cylinder hydraulic system, in opposite directions, so that an area of fluid flow through said first pilot-operated variable flow restrictor valve decreases with the increase in said pressure difference between said high-pressure and wheel-cylinder hydraulic systems; and
  a second pilot-operated variable flow restrictor valve connected in series with said first pilot-operated variable flow restrictor valve and disposed between said first pilot-operated variable flow restrictor valve and said solenoid-operated directional control valve, said second pilot-operated variable flow restrictor valve receiving as a pilot pressure the pressure in said wheel-cylinder hydraulic system, so that an area of fluid flow through said second pilot-operated variable flow restrictor valve decreases with the increase in the pressure in said wheel-cylinder hydraulic system.

6. A braking system according to claim 5, wherein said second pilot-operated variable flow restrictor valve comprises:

a housing having a stepped bore which includes a central large-diameter portion, and a rear and a front small-diamter portion having a same diameter and located behind and in front of said large-diameter portion;
  a valve poppet fluid-tightly slidably engaging said front small-diameter portion of said stepped bore;
  a control piston including a body portion fluid-tightly slidably engaging said central large-diameter portion of said stepped bore, and a counterbalancing portion which has the same diameter as said valve poppet and which extends rearwardly from said body portion so as to fluid-tightly slidably engage said rear small-diameter portion of said stepped bore; and
  a fluid passage for applying to said counterbalancing portion a pressure which is equal to a pressure which said valve poppet receives, whereby a force which acts on said body portion due to the pressure acting on said valve poppet is counterbalanced by the pressure applied to said counterbalancing portion.

7. A braking device according to claim 1, wherein said hydraulic pressure source comprises a master cylinder which produces a pressure in response to an operation of a brake operating member, and said fluid passage of said high-pressure hydraulic system consists of a passage connecting said master cylinder to said solenoid-operated directional control valve device, said braking device further comprising a by-pass passage connecting said master cylinder and said wheel cylinder while by-passing said variable flow restrictor device, and a solenoid-operated shut-off valve disposed in said by-pass passage, said shut-off valve being normally held open, and being closed when the fluid pressure in said wheel cylinder is controlled by said electric control device.

8. A braking device according to claim 1, wherein said electric control device comprises an anti-lock brake control device which is provided with detector means for detecting a slip of said wheel upon brake application to said wheel, said anti-lock brake control device being operable to control the fluid pressure in said wheel cylinder so as to prevent an excessive amount of said slip of the wheel.

9. A braking device having a function of automatically regulating a pressure of a fluid in a wheel cylinder for applying brake to a wheel of a vehicle, comprising:
  a high-pressure hydraulic system including a hydraulic pressure source, and a fluid passage connected to said hydraulic pressure source;
  a wheel-cylinder hydraulic system including said wheel cylinder, and a fluid passage connected to said wheel cylinder;
  a low-pressure hydraulic system including a reservoir and a fluid passage connected to said reservoir;
  a solenoid-operated directional control valve device for fluid communication of said wheel-cylinder hydraulic system selectively with said high-pressure hydraulic system or said low-pressure hydraulic system;
  an electric control device connected to said directional control valve device for controlling the directional control valve device to thereby control the fluid pressure in said wheel cylinder; and
  a variable flow restrictor valve device disposed in said fluid passage of said wheel-cylinder hydraulic system, for decreasing a rate of flow of the fluid through said fluid passage of said wheel-cylinder hydraulic system, with an increase in a pressure difference between said high-pressure and wheel-cylinder hydraulic systems, and with an increase in a pressure in said wheel-cylinder hydraulic system.

10. A braking device having a function of automatically regulating a pressure of fluid in a wheel cylinder for applying brake to a wheel of a vehicle, comprising:
a high-pressure hydraulic system including a hydraulic pressure source, and a fluid passage connected to said hydraulic pressure source;
a wheel-cylinder hydraulic system including said wheel cylinder, and a fluid passage connected to said wheel cylinder;
a low-pressure hydraulic system including a reservoir and a fluid passage connected to said reservoir;
a solenoid-operated directional control valve device for fluid communication of said wheel-cylinder hydraulic system selectively with said high-pressure hydraulic system or said low-pressure hydraulic system;
an electric control device connected to said directional control valve device for controlling the directional control valve device to thereby control the fluid pressure in said wheel cylinder;
a first pilot-operated variable flow restrictor valve disposed in said fluid passage of said high-pressure hydraulic system and having opposite pressure-receiving surfaces which receive as respective pilot pressures a pressure in said high-pressure hydraulic system and the pressure in said wheel-cylinder hydraulic system, in opposite directions, so that a rate of fluid flow through said first pilot-operated variable flow restrictor valve and thus through said fluid passage of said high-pressure hydraulic system decreases with the increase in said pressure difference between said high-pressure and wheel-cylinder hydraulic systems; and
a second pilot-operated variable flow restrictor valve disposed in said fluid passage of said wheel-cylinder hydraulic system, and receiving as a pilot pressure the pressure in said wheel-cylinder hydraulic system, so that a rate of fluid flow through said second pilot-operated variable flow restrictor valve and thus through said fluid passage of said wheel cylinder hydraulic system decreases with the increase in the pressure in said wheel-cylinder hydraulic system.

11. A braking device according to claim 10, wherein at least one of the fluid passages of said high-pressure and low-pressure hydraulic systems is provided with flow restrictor means which is different from said first and second pilot-operated variable flow restrictor valves.

12. A braking device having a function of automatically regulating a pressure of a fluid in a wheel cylinder for applying brake to a wheel of a vehicle, comprising:
a high-pressure hydraulic system including a hydraulic pressure source, and a fluid passage connected to said hydraulic pressure source;
a wheel-cylinder hydraulic system including said wheel cylinder, and a fluid passage connected to said wheel-cylinder;
a low-pressure hydraulic system including a reservoir and a fluid passage connected to said reservoir;
a solenoid-operated directional control valve device for fluid communication of said wheel-cylinder hydraulic system selectively with said high-pressure hydraulic system or said low-pressure hydraulic system;
an electric control device connected to said directional control valve device for controlling the directional control valve device to thereby control the fluid pressure in said wheel cylinder; and
variable flow restrictor means disposed in at least one of said fluid passage of said high-pressure hydraulic system and said fluid passage of said wheel-cylinder hydraulic system for decreasing a rate of flow of the fluid through at least one of said fluid passage of the high-pressure hydraulic system and said fluid passage of the wheel-cylinder hydraulic system with an increase in a pressure difference between said high-pressure and wheel-cylinder hydraulic systems, and with an increase in a pressure in said wheel-cylinder hydraulic system.

13. A braking device as claimed in claim 1 wherein said variable flow restrictor device produces a progressive fluid flow restriction.

14. A braking device as claimed in claim 9 wherein said variable flow restrictor value device produces a progressive fluid flow restriction.

15. A braking device as claimed in claim 10 wherein said first and said second pilot-operated variable flow restrictor valves produce a progressive fluid flow restriction.

16. A braking device as claimed in claim 12 wherein said variable flow restrictor means produces a progressive fluid flow restriction.

* * * * *